United States Patent [19]

Linden

[11] Patent Number: 4,672,000

[45] Date of Patent: Jun. 9, 1987

[54] VAPOR PERMEATION CURABLE COATINGS COMPRISING POLY(NITRO ALCOHOL) RESINS AND MULTI-ISOCYANATE CURING AGENTS

[75] Inventor: Gary L. Linden, Upper Arlington, Ohio

[73] Assignee: Ashland Oil, Inc., Ashland, Ky.

[21] Appl. No.: 740,012

[22] Filed: May 31, 1985

[51] Int. Cl.$^4$ .............................................. B32D 27/00
[52] U.S. Cl. ................... 428/425.1; 427/340; 427/385.5; 427/426; 428/423.1; 428/425.8; 428/425.9
[58] Field of Search ............. 427/30, 340, 426, 255.6, 427/248.1, 385.5; 528/65, 85; 428/423.1, 425.9, 425.1, 425.8

[56] References Cited

U.S. PATENT DOCUMENTS

| 3,087,961 | 4/1963 | Fischer | 528/85 |
| 3,101,378 | 8/1963 | Linden | 528/85 |
| 3,245,962 | 4/1966 | Fischer | 528/85 |
| 3,288,863 | 11/1966 | Hall et al. | 528/85 |
| 3,375,220 | 3/1968 | Clark et al. | 528/85 |
| 3,475,383 | 10/1969 | Stewart | 528/85 |
| 3,874,898 | 4/1975 | McInnes et al. | 427/340 |
| 4,201,853 | 5/1980 | Henry et al. | 528/85 |
| 4,343,839 | 8/1982 | Blegen | 427/340 |
| 4,368,222 | 1/1983 | Blegen et al. | 427/340 |
| 4,374,181 | 2/1983 | Blegen | 427/340 |

*Primary Examiner*—Norman Morgenstern
*Assistant Examiner*—Janyce A. Bell
*Attorney, Agent, or Firm*—Mueller and Smith

[57] ABSTRACT

Disclosed is a coating composition which is rapidly curable at room temperature in the presence of a vaporous tertiary amine catalyst. The coating composition comprises a poly(nitro alcohol) compound and a multi-isocyanate curing agent.

20 Claims, No Drawings

VAPOR PERMEATION CURABLE COATINGS COMPRISING POLY(NITRO ALCOHOL) RESINS AND MULTI-ISOCYANATE CURING AGENTS

BACKGROUND OF THE INVENTION

The present invention relates to vapor permeation curable coatings and more particularly to the synthesis and utilization of poly(nitro alcohol) resins therefor.

Vapor permeation curable coatings traditionally are a class of coatings formulated from aromatic hydroxyl-functional polymers and multi-isocyanate cross-linking agents wherein an applied film thereof is cured by exposure to a vaporous tertiary amine catalyst. In order to contain and handle the vaporous tertiary amine catalyst economically and safely, curing chambers were developed. Curing chambers typically are substantially empty boxes through which a conveyor bearing the coated substrate passes and in which the vaporous tertiary amine, normally borne by an inert gas carrier, contacts such coated substrate. The use of aromatic hydroxy-functional polymers is recommended if a stable one-pack system is required. If two-pack formulations are acceptable, then use of aliphatic hydroxyl-functional resins can be made. Multi-isocyanate cross-linking agents in traditional vapor permeation curable coatings contain at least some aromatic isocyanate groups in order for practical cure rates to be achieved.

Such traditional vapor permeation curable coatings requirements have been altered to a degree by the vaporous amine catalyst spray method disclosed by Blegen in application U.S. Ser. No. 06/615,135, filed May 30, 1984 now U.S. Pat. No. 4,517,222. Such vaporous catalyst spray method relies on the concurrent generation of an atomizate of a coating composition and a carrier gas bearing a catalytic amount of a vaporous tertiary amine catalyst. Such generated atomizate and vaporous catalytic amine-bearing carrier gas flow are admixed and directed onto a substrate to form a film thereof. Curing is rapid and use of a curing chamber is not required. Moreover, all aliphatic isocyanate curing agents can be utilized in such spray process. Hydroxyl groups on the resin, however, still are required.

One drawback to the requirement of aromatic hydroxyl groups on the resin is the inherent limitation which such aromaticity provides in formulating high solids coatings. The same is true of the requirement of aromaticity in the multi-isocyanate cross-linking agent. Such non-volatile solids content restriction even applies to the vaporous amine catalyst spray method described above.

BROAD STATEMENT OF THE INVENTION

The present invention solves many of the limitations which have been placed on chamber cured vapor permeation curable coatings. The method for curing a film of a coating composition in accordance with the present invention comprises exposing said coating composition as an atomizate or as an applied film to a vaporous tertiary-amine catalyst. The coating composition comprises a poly(nitro alcohol) compound and a multi-isocyanate curing agent. As an applied film, the coating composition is cured by exposure of an applied film of said coating composition to a vaporous tertiary amine catalyst in a curing chamber. Alternatively, an atomizate of said coating composition can be generated and admixed with a vaporous tertiary amine catalyst, which mixture then is applied to a substrate and cured.

Advantages of the present invention include the ability to cure a coating composition at room temperature in rapid fashion. Another advantage is the ability to formulate a higher solids coating composition of relatively low viscosity. These and other advantages will become readily apparent to those skilled in the art based upon the disclosure contained herein.

DETAILED DESCRIPTION OF THE INVENTION

The use of poly(nitro alcohol)-functional monomers, oligomers, or polymers in vapor permeation curable coatings retains the advantageous properties achieved in the use of aromatic hydroxyl-functional compounds and polymercapto-functional compounds including the ability to formulate single package systems which are storage stable for several hours or longer, but which formulations rapidly cure at room temperature by exposure to vaporous tertiary amine catalysts. Several unique benefits additionally are achieved by the use of such resinous or non-resinous poly(nitro alcohols). One of these benefits is the ability to formulate very high solids coatings. Such higher solids content, in part, is due to the freedom which the use of poly(nitro alcohols) permits in reducing aromatic content of both the resin and the curing agent. That is, aromaticity adjacent the nitro alcohol groups is not required for storage stability nor for curability of the coating composition. Also, aromaticity is not required of the curing agent in order for room temperature rapid cure to be achieved in the presence of vaporous tertiary amine catalysts. It will be appreciated that aromaticity was quite desirable in polyol-containing coating compositions when conventional chamber cure techniques were employed. Another benefit in the ability to formulate coating compositions diminished in aromatic groups is the ability to increase the flexibility of the cured coating composition. This is true since it is difficult to arrive at too flexible of a system with high elongation since aromatic groups tend to impact steric hindrance to the polymer resulting in increased brittleness. Of course, traditional vapor permeation curable coating compositions contained at least some aromatic curing agent in order for rapid cure to be achieved and contained aromatic hydroxyl functionality on the resin in order to retain benefits of increased pot life of the coating composition. The use of poly(nitro alcohol) resins in accordance with the precepts of the present invention provides greater flexibility in formulating vapor permeation curable coatings.

Monomers, oligomers, and polymers containing pendant nitro alcohol groups are commercially available or can be readily synthesized. For example, when olefins are treated with $N_2O_4$ in an ether, ester, or alkane solvent, vic-dinitro compounds and beta-nitro alkyl nitrites are produced (March, *Advanced Organic Chemistry*, 2d Ed., p. 754, McGraw-Hill, Inc., 1977). The reaction may be successfully performed with all kinds of olefins and acetylenes. Generally, both products are produced. The ester is quite reactive and upon addition of water or alcohol, it is hydrolyzed to a beta-nitro alcohol. Beta-nitro alcohols also can be prepared indirectly by the addition of acetyl nitrate to double bonds. The resulting beta-nitro acetate can be hydrolyzed to the alcohol (March, p. 755, supra). Further synthesis schemes will be readily apparent to those skilled in the art. The nitro alcohol groups are pendantly attached to the oligomer or polymer. For purposes of this application, pendant nitro alcohol groups include terminal nitro alcohol groups. By pendantly attached is meant that such nitro alcohol groups are attached to the polymer chain or to a pendant side chain of the polymer or oligomer. The resinous material containing pendant nitro alcohol groups should be at least difunctional for cross-linking with the curing agent, though higher degrees of functionality may be used also. Mono-functional nitro alcohol-containing materials may be used as a reactive diluent.

Representative poly(nitro alcohols) suitable for use in the coating compositions of the present invention or for synthesizing resinous nitro alcohols, include, for example, 2-nitro-2-ethyl-1,3-propanediol, tris(hydroxymethyl)nitromethane, 2-nitro-2-methyl-1,3-propanediol, and the like, and mixtures thereof.

Multi-isocyanate cross-linking agents cross link with the nitro alcohol groups of the resulting adduct-capped polymer under the influence of a vaporous tertiary amine to cure the coating. Aromatic isocyanates may be preferred in order to obtain reasonable pot life and the desired rapid reaction in the presence of the vaporous tertiary amine catalysts at room temperature. For high performance coatings, initial color as well as the discoloration due to sunlight can be minimized by including at least a moderate level of aliphatic isocyanate content in the curing agent. Of course, polymeric isocyanates are employed in order to reduce toxic vapors of isocyanate monomers. Further, alcohol-modified and other modified isocyanate compositions find utility in the invention. Multi-isocyanates preferably will have from about 2-4 isocyanate groups per molecule for use in the coating composition of the present invention. Suitable multi-isocyanates for use in the present invention include, for example, hexamethylene diisocyanate, 4,4'-toluene diisocyanate (TDI), diphenylmethane diisocyanate (MDI), polymethyl polyphenyl isocyanate (Polymeric MDI or PAPI), m- and p-phenylene diisocyanates, bitolylene diisocyanate, triphenylmethane triisocyanate, tris-(4-isocyanatophenyl) thiophosphate, cyclohexane diisocyanate (CHDI), bis-(isocyanathomethyl) cyclohexane ($H_6$XDI), dicyclohexylmethane diisocyanate ($H_{12}$MDI), trimethylhexane diisocyanate, dimer acid diisocyanate (DDI), dicyclohexylmethane diisocyanate, and dimethyl derivatives thereof, trimethyl hexamethylene diisocyanate, lysine diisocyanate and its methyl ester, isophorone diisocyanate, methyl cyclohexane diisocyanate, 1,5-napthalene diisocyanate, triphenyl methane triisocyanate, xylylene diisocyanate and methyl and hydrogenated derivatives thereof, polymethylene polyphenyl isocyanates, chlorophenylene-2,4-diisocyanate, and the like and mixtures thereof. Aromatic and aliphatic polyisocyanate dimers, trimers, oligomers, polymers (including biuret and isocyanurate derivatives), and isocyanate functional prepolymers often are available as preformed packages and such packages are suitable for use in the present invention also.

The ratio of nitro alcohol groups from the poly(nitro alcohol) resinous materials to the isocyanate equivalents of the multi-isocyanate cross-linking agents preferably should be greater than about 1:1 and can range on up to about 1:2. The precise intended application of the coating composition often will dictate this ratio or isocyanate index.

As noted above, a solvent or vehicle may be included as part of the coating composition. Volatile organic solvents may include ketones and esters for minimizing viscosity, though some aromatic solvent may be necessary and typically is part of the volatiles contained in commercial isocyanate polymers. Representative volatile organic solvents include, for example, methyl ethyl ketone, acetone, methyl isobutyl ketone, ethylene glycol monoethyl ether acetate (sold under the trademark Cellosolve acetate), and the like. Organic solvents commercially utilized in polyisocyanate polymers include, for example, toluene, xylene, and the like. It should be noted that the effective non-volatile solids content of the coating composition can be increased by incorporation of a relatively low or non-volatile (high boiling) ester plasticizer which is retained for the most part in the cured film. Such sutiable ester plasticizers include, for example, dibutyl phthlate, di(2-ethylhexyl) phthlate (DOP), and the like. The porportion of ester plasticizer should not exceed about 5–10% by weight, otherwise loss of mar resistance can occur.

The coating composition additionally can contain opacifying pigments and inert extenders such as, for example, titanium dioxide, zinc oxide, clays such as kaolinite clays, silica, talc, carbon or graphite (e.g. for conductive coatings), and the like. Additionally, the coating compositions can contain tinctorial pigments, corrosion-inhibiting pigments, and a variety of agents typically found in coating compositions. Such additional additives include, for example, surfactants, flow or leveling agents, pigment dispersants, and the like.

As to the performance requirements which are met by the coating composition, it should be noted that the coating composition, poly(nitro alcohol) resin and multi-isocyanate cross-linking agent, can have a minimum pot life of at least 4 hours in an open pot and generally the coating can be formulated to have a pot life which exceeds 8 hours and can range on up to 18 hours or more. Such long pot life means that refilling the pot at the plant during shifts generally is not required. Moreover, the pot life of the coating composition in a closed container can exceed one month depending upon formulation of the coating composition. After storage of the coating composition, the stored composition can be cut to application viscosity with suitable solvent (if required) and such composition retains all of the excellent performance characteristics which it initially possessed.

The vaporous amine catalyst will be a tertiary amine include, for example, tertiary amines containing substituents such as alkyl, alkanol, aryl, cycloaliphatic, and mixtures thereof. Additionally, heterocyclic tertiary amines may be suitable for use in the invention also. Representative tertiary amines include, for example, triethyl amine, dimethyl ethyl amine, trimethyl amine, tributyl amine, dimethyl benzyl amine, dimethyl cyclohexyl amine, dimethyl ethanol amine, diethyl ethanol amine, triethanol amine, pyridine, 4-phenylpropyl pyridine, 2,4,6-collidine, quinoline, isoquinoline, N-ethyl morpholine, triethylene diamine, and the like and mixtures thereof. Additionally, it is conceivable to use amine oxides and quaternary ammonium amines depending upon the practicality of providing such amines in the vaporous phase. A myriad of proprietary tertiary amine catalysts currently are available and should function in the process additionally. It should be noted that the catalytic activity of the tertiary amine catalysts may be enhanced by the addition of complex salts to the coating composition as reported in the bulletin, "The Activation of IPDI by Various Accelerator Systems", Veba-Chemie AG, Gelsenkirchen-Buer, West Germany. Thus, the addition of ferric, manganic, and aluminum salts to the liquid coating composition may be implemented as an embodiment of the present invention.

While the proportion of vaporous amine catalyst may range on up to 6% or more, percentages of less than 1 volume-percent typically will suffice, e.g. between about 0.25 and 1% by volume. It should be cautioned that higher levels of amine catalyst are not recommended where air or sources for molecular oxygen are present as explosive mixtures may result. The tertiary amine catalyst is in vaporous form in a carrier gas which may be inert, such as nitrogen or carbon dioxide, or may be in air, or mixtures thereof. It will be appreciated that depending upon the carrier gas and the particular tertiary amine catalyst of choice, certain minimum temperatures and pressures of the atomizing gas stream must be maintained in order to ensure that the amine catalyst remains vaporous and does not condense in any lines. Additionally, the proportion of amine and carrier gas may be altered depending upon whether a conventional curing chamber is utilized or whether the Blegen vaporous amine catalyst spray method is employed. In this regard, the preferred curing chambers for use with the coating compositions of the present invention are disclosed in U.S. Pat. Nos. 4,491,610 and 4,492,041. It must be recognized, however, that other curing chambers may be utilized, e.g. as disclosed in U.S. Pat. Nos. 3,851,402 and 3,931,684.

Upon exposure to vaporous tertiary amine catalyst, the alcohol groups of the nitro alcohol structure on the resinous material and isocyanate groups of the curing agent react to form a cured network of urethane groups. The reaction is rapid at room temperature enabling handling of cured parts in a short time following catalyst cure, e.g. often as short as 1–5 minutes. Such rapid curing retention of the coating compositions of the present invention is a decided benefit. In this regard, it will be appreciated that such rapid cure also takes place whether the curing agent is all aliphatic, all aromatic, or a mixture of aliphatic and aromatic isocyanates.

A variety of substrates can be coated with the coating compositions of the present invention. Substrates include metal, such as, for example, iron, steel, aluminum, copper, galvanized steel, zinc, and the like. Additionally, the coating composition can be applied to wood, fiberboard, RIM, SMC, vinyl, acrylic, other polymeric or plastic material, paper, and the like. Since the coating compositions can be cured at room temperature, thermal damage to thermally-sensitive substrates is not a limitation on use of the coating compositions of the present invention. Further, with the ability to use the Blegen vaporous amine catalyst spray method, the flexibility in use of the coating compositions of the present invention is enhanced even further.

The following examples show how the present invention can be practiced but should not be construed as limiting. In this application, all percentages and proportions of the coating compositions are by weight and all percentages and proportions of the vaporous tertiary amine catalyst are by volume, unless otherwise expressly indicated. Also, all units are in the metric system and all citations referred to herein are expressly incorporated by reference.

EXAMPLES

Example 1

Tris(hydroxymethyl) nitromethane was evaluated with two different curing agents in the following coating formulations.

TABLE 1

| | Coating (g) | |
|---|---|---|
| Ingredient | 18-1 | 18-2 |
| Tris(hydroxymethyl nitromethane)[1] | 16.8 | 25.2 |
| Curing Agent[2] | 80.4 | 69.3 |
| Cellosolve Acetate[3] | — | — |
| N—Methyl Pyrrolidone | 15.0 | 15.0 |
| Wt. % Solids | 52.0 | 67.7 |

[1] 60% by weight in N—methyl-2-pyrrolidone
[2] Coating 18-1: Mondur HC isocyanate, an approximately tetra-functional reaction product of hexamethylene diisocyanate & toluene diisocyanate (11.5% NCO content, equivalent weight of 365, 60% solids in Cellosolve acetate/xylene, Mobay Chemical Corporation).
Coating 18-2: Desmodur N-3390 isocyanate is an aliphatic isocyanurate of hexamethylene diisocyanate (20% NCO content, 90% solids in butyl acetate, equivalent weight of 210, Mobay Chemical Corporation).
[3] Cellosolve acetate is ethylene glycol monoethyl ether acetate (Union Carbide Corporation).

Each of the coatings was cured by exposure to triethyl amine catalyst (0.5 vol-% for Coating 18-1 and 0.9 vol-% W for Coating 18-2) in a curing chamber and subjected to survey performance testing. The following results were recorded.

TABLE 2A

| Coating | Viscosity (cps) | | | | | Cure Time (sec) | Sward[1] Hardness | | MEK[2] Rub | |
|---|---|---|---|---|---|---|---|---|---|---|
| | Initial | 4 hr | 24 hr | 48 hr | 72 hr | | RT[3] | HT[4] | RT | HT |
| 18-1 | 145 | Gelled | — | — | — | 60 | 44,42 | 52,52 | 100+ | 100+ |
| 18-2 | 115 | 115 | 170 | 400 | 585 | 300 | 30,26 | 66,58 | 75 | 100+ |

[1] Plate glass is defined as 100 for Sward Hardness; two readings per panel were taken.
[2] Methyl ethyl ketone (MEK) wetted rag rubbed over one area of cured film with moderate thumb pressure until glass substrate is visible.
[3] RT: Samples allowed to stand 3 days at room temperature prior to testing.
[4] HT: Samples held at 160° C. for 5 minutes after vaporous amine catalyst exposure, then allowed to stand for 3 days at room temperature prior to testing.

TABLE 2B

| | SOLVENT RESISTANCE[1] | | | | | | | |
|---|---|---|---|---|---|---|---|---|
| | H₂O | | 5% NaOH | | 10% H₂SO₄ | | Xylene | |
| Coating | RT | HT | RT | HT | RT | HT | RT | HT |
| 18-1 | Pass | Pass | Pass | Fail | Pass | Pass | Pass | Pass |
| 18-2 | Fail | Pass | Fail | Pass | Fail | Pass | Pass | Pass |

[1] The indicated solvent in a pool on the coating is placed under a watch glass for 24 hours at ambient indoor temperature and then the solvent resistance of the coating judged.

The above-tabulated results demonstrate that pot life and rapid cure can be designed into a vapor permeation curable coating containing nitro alcohol groups. Moreover, good performance was demonstrated by these coating formulations at moderately high non-volatile solids content.

Example 2

Coatings were formulated from 2-nitro-2-ethyl-1,3-propanediol (60% solids in N-methyl-2-pyrrolidone) as follows:

TABLE 3

| Ingredient | Coating (g) 19-1 | Coating (g) 19-2 |
| --- | --- | --- |
| 2-Nitro-2-ethylene-1,3-propanediol | 24.8 | 33.8 |
| Curing Agent* | 80.4 | 55.4 |
| N—Methyl-2-pyrrolidone | 6.0 | — |
| Cellosolve acetate | — | 4.0 |
| Wt. % Solids | 56.7 | 54.2 |

*Coating 19-1: Mondur HC isocyanate of Example 1
Coating 19-2: Desmodur N-3390 isocyanate of Example 1

Each coating was cured by exposure to triethyl amine catalyst (0.5 vol-% for Coating 19-1 and 0.9 vol-% for Coating 19-2) in a curing chamber. Survey performance testing (like in Example 1) was conducted with the following results being recorded.

TABLE 4A

| Coating | Viscosity (cps) Initial | 4 hr | 24 hr | 48 hr | 72 hr | Cure Time (sec) | Sward[1] Hardness RT[3] HT[4] | MEK[2] Rub RT | HT |
| --- | --- | --- | --- | --- | --- | --- | --- | --- | --- |
| 19-1 | 140 | 30,000 | Gelled | — | — | 120 | 40,46 48,54 | 100+ | 100+ |
| 19-2 | 145 | 175 | 365 | 895 | 1260 | 240 | 20,20 66,72 | 18 | 13 |

TABLE 4B

| | SOLVENT RESISTANCE[1] | | | | | | | |
| --- | --- | --- | --- | --- | --- | --- | --- | --- |
| | H$_2$O | | 5% NaOH | | 10% H$_2$SO$_4$ | | Xylene | |
| Coating | RT | HT | RT | HT | RT | HT | RT | HT |
| 19-1 | Pass | Pass | Pass | Fail | Pass | Pass | Pass | Pass |
| 19-2 | Pass | Pass | Fail | Fail | Fail | Pass | Pass | Pass |

Again, the coatings of the present invention are demonstrated. Especially good performance again is seen for the coating which uses the mixed aliphatic/aromatic isocyanate curing agent.

Example 3

Coatings were formulated using 2-nitro-2-methyl-1,3-propanediol (50% solids in N-methyl-2-pryrrolidone) as follows:

TABLE 5

| Ingredient | Coating (g) 20-1 | Coating (g) 20-2 |
| --- | --- | --- |
| 2-Nitro-2-methyl-1,3-propanediol | 23.8 | 47.6 |
| Curing Agent* | 40.2 | 46.2 |
| Wt. % Solids | 56.3 | 69.7 |

*Coating 20-1: Mondur HC isocyanate of Example 1
Coating 20-2: Desmodur N-3390 isocyanate of Example 1

Each coating was cured by exposure to triethyl amine catalyst (0.5 wt.-% for Coating 20-1 and 0.9 wt.-% for Coating 20-2) in a curing chamber. Survey performance testing like that conducted in Example 1 was conducted with the following results being recorded.

TABLE 6A

| Coating | Viscosity (cps) Initial | 4 hr | 24 hr | 48 hr | 72 hr | Cure Time (sec) | Sward[1] Hardness RT[3] HT[4] | MEK[2] Rub RT | HT |
| --- | --- | --- | --- | --- | --- | --- | --- | --- | --- |
| 20-1 | 110 | Gelled | — | — | — | 60 | 42,46 58,56 | 100+ | 100+ |
| 20-2 | 120 | 235 | 660 | 1100 | 1400 | 180 | 8,8 48,56 | 9 | 20 |

TABLE 6B

| | SOLVENT RESISTANCE[1] | | | | | | | |
| --- | --- | --- | --- | --- | --- | --- | --- | --- |
| | H$_2$O | | 5% NaOH | | 10% H$_2$SO$_4$ | | Xylene | |
| Coating | RT | HT | RT | HT | RT | HT | RT | HT |
| 20-1 | Pass | Pass | Pass | Fail | Pass | Pass | Pass | Pass |
| 20-2 | Pass | Pass | Fail | Fail | Fail | Fail | Pass | Pass |

Once again, the performance of the inventive coatings is demonstrated. Cure of the coatings is rapid at room temperature whether or not any aromaticity is contained in the curing agent. Also, aromatic groups on the nitro alcohol resin are not required.

I claim:

1. Method for curing a film of a coating composition which comprises exposing said coating composition as an atomizate to a vaporous tertiary amine catalyst followed by application to a substrate or as an applied film thereof on a substrate to said vaporous tertiary amine catalyst, said coating composition comprising a poly(nitro alcohol) compound and a multi-isocyanate curing agent.

2. The method of claim 1 wherein said coating composition is dispersed in a fugitive organic solvent.

3. The method of claim 1 wherein said poly(nitro alcohol) compound is a monomer, oligomer, or polymer.

4. The method of claim 1 wherein the molar ratio of nitro alcohol groups to isocyanate groups in said coating composition is between about 1:1 and 1:2.

5. The method of claim 1 wherein said coating composition also contains a particulate filler.

6. The method of claim 1 wherein said poly(nitro alcohol) compound is selected from 2-nitro-2-ethyl-1,3-propanediol, tris(hydroxymethyl)-nitromethane, 2-nitro-2-methyl-1,3-propanediol, and mixtures thereof.

7. The method of claim 1 wherein the coating composition is cured by exposure of an applied film thereof to a vaporous tertiary amine catalyst.

8. The method of claim 1 wherein an atomizate of said coating composition concurrently generated with a vaporous tertiary amine catalyst are admixed, said mixture applied to a substrate, and said coating composition cured.

9. The method of claim 1 wherein said curing agent is selected from an aliphatic multi-isocyanate curing agent, an aromatic multi-isocyanate curing agent, and mixtures thereof.

10. In a method for curing a film of a coating composition which comprises exposing said coating composition as an atomizate to a vaporous tertiary amine catalyst followed by application to a substrate or as an applied film thereof on a substrate to said vaporous tertiary amine catalyst, said coating composition comprising a polyol or a polymercapto compound, and a multi-isocyanate curing agent, the improvement which comprises providing said coating composition which additionally contains a nitro alcohol compound.

11. The process of claim 10 wherein said nitro alcohol compound is a mono nitroalcohol compound, a poly(nitrol alcohol) compound, or mixtures thereof.

12. The process of claim 10 wherein said multi-isocyanate curing agent is an aromatic multi-isocyanate, an aliphatic multi-isocyanate, and mixtures thereof.

13. A coated substrate having a film of a cured coating composition thereon, said coating composition comprising a poly(nitro alcohol) compound and a multi-iscyanate curing agent, said coating composition having been cured by exposure as an atomizate to a vaporous tertiary amine catalyst followed by application to said substrate or by exposure of an applied film thereof on said substrate to said vaporous tertiary amine catalyst.

14. The coated substrate of claim 13 wherein said substrate is selected from the group consisting of metal, wood, fiberboard, reaction injection molded urethane substrate, sheet molding compound substrate, vinyl, acrylic, or paper.

15. The coated substrate of claim 13 wherein said coating composition additionally comprises a fugitive organic solvent.

16. The coated substrate of claim 13 wherein said poly(nitro alcohol) compound is selected from a monomer, oligomer, or polymer.

17. The coated substrate of claim 13 wherein said coating composition additionally comprises a particulate filler.

18. The coated substrate of claim 13 wherein said poly(nitro alcohol) compound is selected from 2-nitro-2-ethyl-1,3-propanediol, tris(hydroxy methyl)-nitromethane, 2-nitro-2-methyl-1,3-propanediol, and mixtures thereof.

19. The coating composition of claim 13 wherein said multi-isocyanate curing agent is selected from an aliphatic multi-isocyanate curing agent, an aromatic multi-isocyanate curing agent, and mixtures thereof.

20. The coated substrate of claim 13 wherein the ratio of nitro alcohol groups to isocyanate groups in said coating composition ranges from between about 1:1 and 1:2.

* * * * *